UNITED STATES PATENT OFFICE.

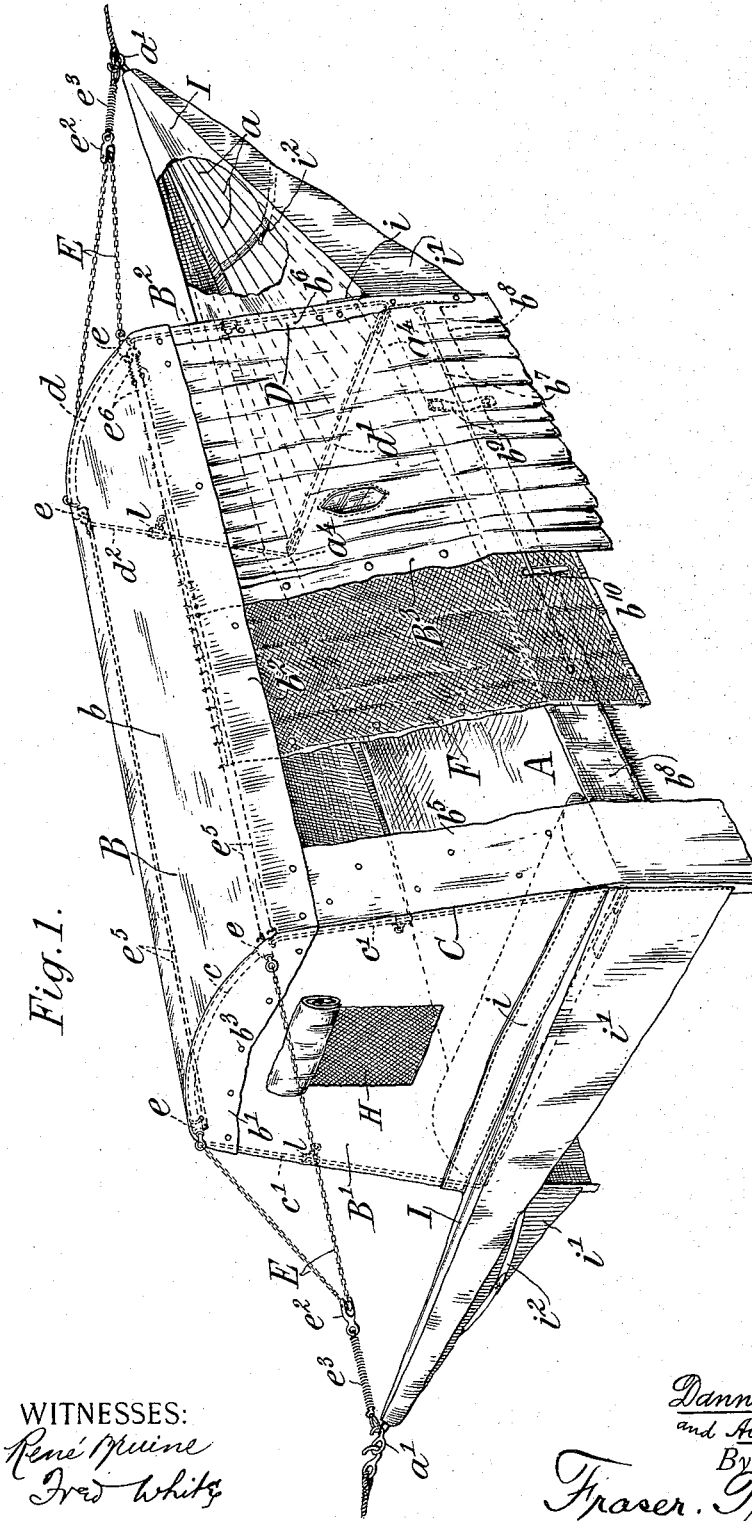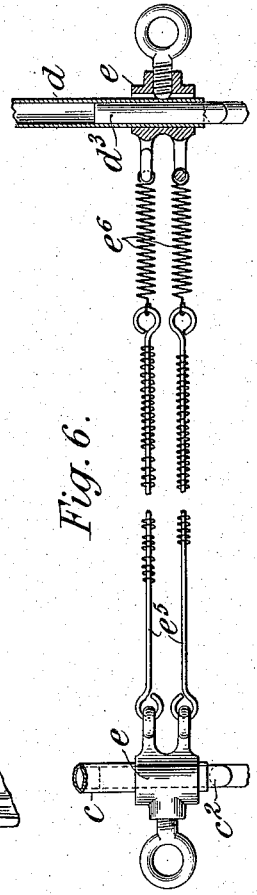

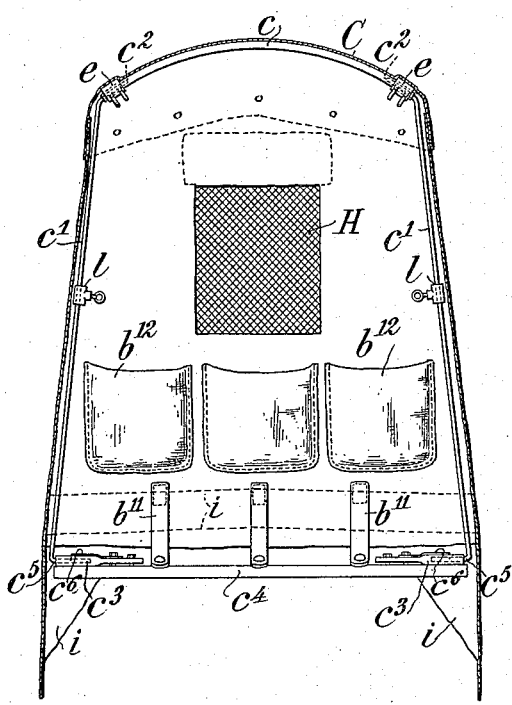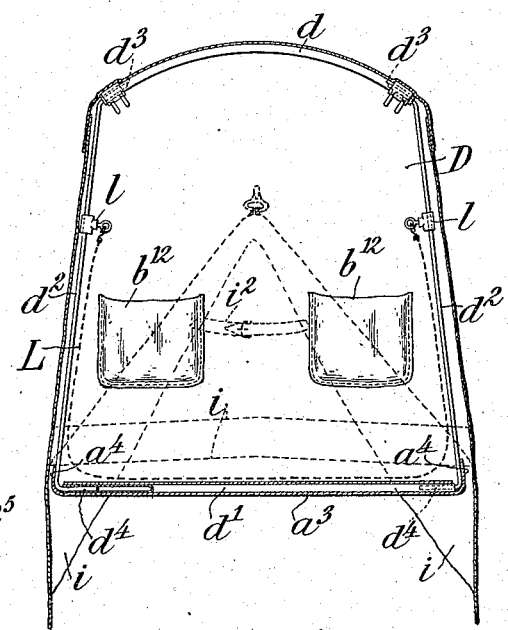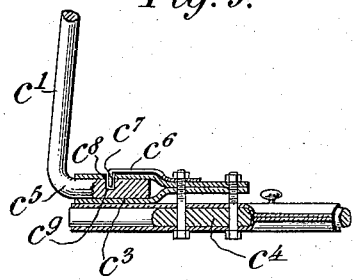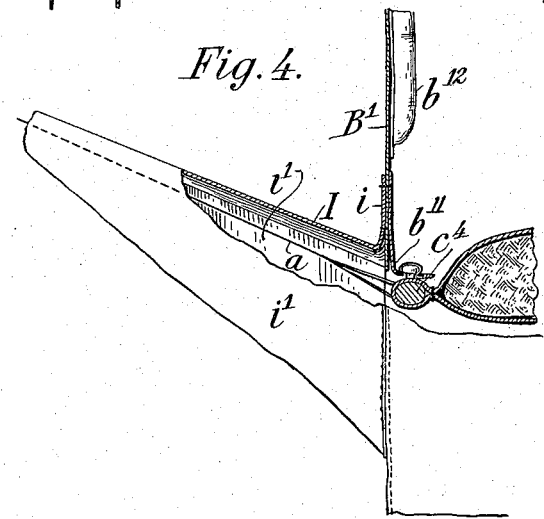

DANNIE G. ASHWORTH AND ALBERT P. ASHWORTH, OF WEST BROOKVILLE, NEW YORK.

HAMMOCK AND HAMMOCK ATTACHMENT.

1,156,200. Specification of Letters Patent. Patented Oct. 12, 1915.

Application filed June 1, 1914. Serial No. 842,206.

*To all whom it may concern:*

Be it known that we, DANNIE G. ASHWORTH and ALBERT P. ASHWORTH, citizens of the United States of America, residing in West Brookville, in the county of Sullivan and State of New York, have invented certain new and useful Improvements in Hammocks and Hammock Attachments, of which the following is a specification.

This invention relates to hammocks and hammock attachments, and aims to provide improvements therein.

The present invention provides a hammock which is especially adapted for the use of persons sleeping out-of-doors, as invalids, pleasure-seekers, automobilists, and other travelers, and provides for protection against the weather, and against insects—especially mosquitos.

The invention further provides a structure which is capable of ready assemblage and disassemblage, which is composed of few and relatively simple parts, and which is durable and efficient in use.

The invention is preferably applicable to hammocks of ordinary construction, and the invention may be built as an attachment thereto.

Other features in the improvement will be hereinafter set forth.

An embodiment of the invention is illustrated in the accompanying drawings, in which—

Figure 1 is a perspective view of the invention; Fig. 2 is a cross-section looking toward the head; Fig. 3 is a cross-section looking toward the foot; Fig. 4 is a detail view showing features of construction at the head of the hammock; Fig. 5 is a detail view, and Fig. 6 is a detail view showing the wires on which the side curtains and netting are suspended.

In said drawings, A designates a hammock, preferably of ordinary construction, having cords $a$ at either end connected to suspension rings $a'$ $a'$ as usual.

B designates a canopy or covering, preferably of waterproof canvas, adapted to provide a covering or housing over the hammock. Frames C and D are provided for supporting the canopy.

The head-frame C is preferably composed of a bowed tubular member $c$ (Fig. 2) and two upright members $c^1$ $c^1$, the upper ends $c^2$ $c^2$ of which are bent inwardly and are adapted to fit within the ends of the tubular portion $c$. The ends $c^2$ of the upright members $c^1$ are held in engagement with the member $c$ by the canopy which fits over them. Socket pieces $c^3$ $c^3$, preferably formed of tubular metal flattened at one end, are attached to the spreader $c^4$ at the head of the hammock. The lower ends $c^5$ $c^5$ of the uprights $c^1$ $c^1$ are bent inward and are adapted to fit within the socket pieces $c^3$ $c^3$. Means are preferably provided for maintaining the ends $c^5$ $c^5$ in the socket pieces $c^3$ $c^3$. These means preferably comprise a spring $c^6$ attached to the socket pieces and having a bent end $c^7$ adapted to fit in slots $c^8$ $c^9$ formed respectively of the socket piece $c^3$ and the end $c^5$ of the uprights $c^1$.

The frame D is preferably formed of an upper bowed tubular member $d$, a lower tubular member $d^1$ (Fig. 3) and two upright members $d^2$ $d^2$. The upper ends $d^3$ of the upright members $d^2$ $d^2$, are bent inwardly, and fit within the ends of the tubular piece $d$. The ends $d^3$ are held in engagement with the tubular piece D by means of the canopy which fits over them. The lower ends $d^4$ $d^4$ of the upright pieces $d^2$ $d^2$ are bent inwardly and fit within the ends of the tubular piece $d^1$. The tubular piece $d^1$ preferably fits within a pocket $a^3$ attached at the foot of the hammock and is preferably of slightly less length than the width of the hammock. The edges $a^4$ $a^4$ of the hammock, under the weight of the frame, may fold up against the sides of the frame D, and hold the lower ends of the uprights $d^2$ $d^2$ in engagement with the end pieces $d'$ $d'$. The frames C and D are maintained upright by means of wires or chains E E at each end of the hammock. The chains E E are preferably attached at each end to eye-pieces $e$ $e$ which are adapted to be attached to the bowed frame pieces $c$ and $d$. The chains E E pass through pulleys $e^2$ $e^2$, which pulleys are attached to the attaching rings $a'$ $a'$ of the hammock by means of comparatively strong springs $e^3$. The pull of the springs $e^3$ $e^3$ on the frames C and D is sustained by the roof $b$ of the canopy and preferably also by pairs of wires $e^5$ $e^5$ at each side of the hammock and preferably attached to the eye-pieces $e$ on the frames C and D. The wires $e^5$ may be attached to the eye-pieces at one end through light springs $e^6$. By this means when the frames are set up it is assured that the wires $e^5$ will always be under tension. The pull upon the chains or cords E will have a component in the direction of the frames C and D which will be transmitted to the hammock, which will produce a tension lengthwise of the hammock and will tend to maintain the hammock taut or flat when the hammock bears a weight, such as the weight of a person.

The canopy B preferably comprises a roof portion $b$ having portions $b^1$ $b^2$ at the ends and sides adapted to hang down on the ends and sides. The canopy further comprises end pieces $B^1$ $B^2$. The end pieces $B^1$ $B^2$ are preferably formed separate from the roof, and are conveniently connected thereto by means of snap fasteners $b^3$. The end piece $B^1$ is also preferably provided at each side with portions $b^5$ adapted to fit at the sides of the hammock. The end piece $B^2$ is also preferably provided at each side with pieces $b^6$ adapted to fit at the sides of the hammock. The end covering $B^1$ may be held down at its lower end by means of straps $b^{11}$ having snap fasteners adapted to coöperate with the snap fasteners on the hammock, Figs. 2 and 4.

The canopy may further comprise side coverings $B^3$, which are preferably suspended from one of the wires of each pair $e^5$, and are adapted to slide thereon in being drawn to opening and closing position. The side coverings $B^3$ and the hanging portions $b^2$ of the roof are preferably provided with snap fasteners which may be fastened together when the side coverings are in closing position in such manner as to make a tight connection between the side coverings and the roof. The ends of the side coverings $B^3$ and side portions $b^5$ $b^6$ of the end coverings are also preferably provided with snap fasteners, whereby the ends of the side coverings $B^3$ may be fastened.

Mosquito nettings F F are preferably provided. These nettings are preferably suspended on one of the wires of each pair $e^5$ and are adapted to slide thereon. The nettings at each end, and the side pieces $b^5$ $b^6$ are provided with snap fasteners for fastening the netting at each end. A wire or strap $b^7$ is preferably provided at each side of the hammock for holding down the lower edges of the side coverings D and mosquito nettings F at the foot. The wire $b^7$ may be connected at both ends to the valance $b^8$ by means of snap fasteners and may pass through an opening $b^{10}$ preferably in the form of a slit provided therefor in the netting. A strap $b^9$ on the inner side of the side covering is adapted to fasten over the wire $b^7$ for holding down the side covering.

The end coverings $B^1$ $B^2$ may be provided with suitable pockets $b^{12}$ $b^{12}$ for the storage of clothes and other articles. The coverings may be provided with windows for light and ventilation, as indicated on the drawings by the letter H.

Coverings I may be provided at each end of the hammock for covering the ropes $a$, thereby preventing the hammock from becoming damp by reason of absorption of moisture from the ropes, or capillarity.

The coverings I may be attached to the end coverings $B^1$ $B^2$ by means of the flaps $i$. The flaps may have a slight rise toward the center, in such manner that the cover may shed water. The coverings I are also preferably provided with hanging portions $i'$ $i'$ at the sides. The portions $i'$ may be attached at their lower ends to the side portions $b^5$ $b^6$. Straps $i^2$ $i^2$ may be provided for bringing the hanging portions $i'$ together and preventing them from flying up in the wind. The space above the ropes $a$ and beneath the coverings I may be utilized for the storage of clothes or other articles.

Eye-pieces $l$ $l$ may be attached to the uprights of the frames C D, to which eye-pieces heavy netting L may be attached to provide a guard to prevent babes or helpless persons from falling out of the hammock.

The invention may receive other embodiments than that herein shown and described.

We claim:—

1. A hammock-attachment comprising head and foot canopy-supporting frames, said head frame having tubular socket pieces adapted to be attached to the hammock in which the lower ends of said side rods are adapted to fit, and means for holding said side rods in said socket pieces, said means comprising a spring arm attached to said socket piece and a cross-cut in said socket piece and side rod into which said spring arm is adapted to fit.

2. A hammock-attachment comprising head and foot canopy-supporting frames, said foot frame having a tubular bottom piece in which the ends of said side pieces of said foot frame are adapted to fit, said tubular bottom piece being adapted to be attached to a hammock and act as a spreader therefor.

3. A hammock attachment comprising a canopy-supporting frame comprising a bottom piece, said frame being of less width at its bottom than the breadth of the hammock, said bottom piece of the frame being adapted to be attached to said hammock and act as a spreader therefor, said hammock being adapted to fold up at its edges against the sides of said frame to form side pieces and to hold said frame in position.

4. A hammock attachment comprising head and foot canopy-supporting frames, said foot frame having a tubular bottom piece adapted to be attached to the hammock in which the ends of said side pieces of said foot frame are adapted to fit, said foot frame being of less width at its bottom than the breadth of the hammock, whereby said hammock is adapted to fold up at its edges against the sides of said frame.

5. A hammock attachment comprising head and foot canopy-supporting frames and means for supporting said frames in upright position, each of said means comprising a chain or cord attached to a frame at opposite sides thereof, and a pulley attached to the hammock through which the chain which passes from one side of the frame to the other passes, and is free to run, dipping to one side of said frame being substantially unopposed by said chain.

6. A hammock attachment comprising head and foot canopy-supporting frames and means for supporting said frames in upright position, each of said means comprising a chain or cord attached to a frame at opposite sides thereof, and a pulley attached to the hammock through which the chain which passes from one side of the frame to the other passes, and is free to run, dipping to one side of said frame being substantially unopposed by said chain, and a spring interposed between said pulley and hammock.

7. A hammock attachment comprising head and foot canopy-supporting frames, and means for supporting said frames in upright position comprising chains or cords attached to said frames at the sides, and pulleys attached to the hammock through which said chains pass from one side of the frame to the other and are free to run, and springs interposed between said pulleys and the hammock, said springs, through the chains, being adapted to exert a downward pressure on said frames, adapted to produce a tension lengthwise of the hammock, for maintaining the same flat and taut.

8. A hammock attachment comprising head and foot water-repellant canopy-supporting frames, and a canopy comprising a roof, substantially vertical end coverings, and coverings attached to the lower of said end coverings and adapted to cover the end ropes of the hammock, said last named coverings lying close to the end ropes.

9. A hammock attachment comprising head and foot canopy-supporting frames, and a canopy comprising a roof, separate side coverings, and a mosquito netting at the sides of the hammock, pairs of wires strung between said frames on each side thereof, on which said mosquito netting and said side coverings are respectively slidably supported.

10. A hammock attachment comprising head and foot canopy-supporting frames, and a canopy comprising a roof and separate side coverings, wires strung between said frames on which said side coverings are slidably mounted, and springs interposed between said wires, and frames for maintaining the wires taut.

11. A hammock attachment comprising head and foot canopy-supporting frames, and a canopy comprising a roof, slidable side coverings, and means for retaining the lower ends of said side coverings comprising a wire or strip passing along the outside of said side coverings, passing through the same and fastened on the valance of the hammock.

12. A hammock attachment comprising head and foot canopy-supporting frames, and a canopy comprising a roof, slidable side coverings and mosquito nettings, and means for retaining the lower ends of said side coverings and mosquito nettings, comprising a wire or strip passing along the outside of said side coverings and mosquito nettings and passing through the same and fastened on the valance of the hammock.

In witness whereof, we have hereunto signed our names in the presence of two subscribing witnesses.

DANNIE G. ASHWORTH.
ALBERT P. ASHWORTH.

Witnesses:
EUGENE RHODES,
W. LEE HELM.